US009984544B2

(12) United States Patent
Wang et al.

(10) Patent No.: US 9,984,544 B2
(45) Date of Patent: May 29, 2018

(54) DEVICE LAYOUT OPTIMIZATION FOR SURVEILLANCE DEVICES

(71) Applicants: Mengjiao Wang, Shanghai (CN); Wen-Syan Li, Shanghai (CN)

(72) Inventors: Mengjiao Wang, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 428 days.

(21) Appl. No.: 14/624,241

(22) Filed: Feb. 17, 2015

(65) Prior Publication Data

US 2016/0240054 A1   Aug. 18, 2016

(51) Int. Cl.
  *H04N 7/18* (2006.01)
  *G08B 13/196* (2006.01)
(52) U.S. Cl.
  CPC ... *G08B 13/19645* (2013.01); *G08B 13/1968* (2013.01); *H04N 7/181* (2013.01)
(58) Field of Classification Search
  None
  See application file for complete search history.

(56) References Cited

U.S. PATENT DOCUMENTS

| | | | |
|---|---|---|---|
| 5,809,161 A | 9/1998 | Auty et al. | |
| 6,965,325 B2 | 11/2005 | Finnern | |
| 7,395,195 B2 | 7/2008 | Suenbuel et al. | |
| 7,986,339 B2 | 7/2011 | Higgins et al. | |
| 8,379,926 B2 | 2/2013 | Kanhere et al. | |
| 8,510,025 B2 | 8/2013 | Chan et al. | |
| 8,675,068 B2 | 3/2014 | Nixon et al. | |
| 8,706,459 B2 | 4/2014 | Gupta et al. | |
| 8,736,678 B2 | 5/2014 | Miller et al. | |
| 8,781,736 B2 | 7/2014 | Smith et al. | |
| 2003/0058342 A1* | 3/2003 | Trajkovic | G06K 9/00771 348/207.1 |
| 2011/0238289 A1 | 9/2011 | Lehmann et al. | |

(Continued)

OTHER PUBLICATIONS

"Sensor Coverage and Location for Real-Time Traffic Prediction in Large-Scale Networks", Xiang Fei, Hani S. Mahmassani, and Stacy M. Eisenman, Transportation Research Record: Journal of the Transportation Research Board, No. 2039, Transportation Research Board of the National Academies, Washington, D.C., 2007, pp. 1-15.*

*Primary Examiner* — Mohammed Rahaman

(74) *Attorney, Agent, or Firm* — Brake Hughes Bellermann LLP

(57) ABSTRACT

A candidate position selector determines locations for M candidate positions along pathways within an area defining potential routes for moving objects within the area. A coverage rate calculator calculates a coverage rate for a device layout of N media capture devices among the M candidate positions, including calculating the coverage rate as a ratio of the moving objects captured by the N media capture devices in the device layout to a total number of the moving objects in the area within a defined period of time. A layout selector iteratively tests different device layouts of the N media capture devices among the M candidate positions, based on corresponding coverage rates calculated by the coverage rate calculator for each tested device layout, until a termination condition is reached and a final device layout of the tested device layouts is selected.

15 Claims, 9 Drawing Sheets

(56) References Cited

U.S. PATENT DOCUMENTS

| | | | |
|---|---|---|---|
| 2012/0069190 A1* | 3/2012 | Nam | H04N 7/181 |
| | | | 348/159 |
| 2012/0307067 A1* | 12/2012 | Chen | H04N 7/181 |
| | | | 348/159 |
| 2013/0090905 A1* | 4/2013 | Gupta | G08G 1/0108 |
| | | | 703/6 |
| 2013/0201339 A1 | 8/2013 | Venkatesh et al. | |
| 2013/0275031 A1 | 10/2013 | Johnson et al. | |
| 2014/0055621 A1* | 2/2014 | Shirani | H04N 7/18 |
| | | | 348/159 |

* cited by examiner

200

Determine M Candidate positions within an area for deployment of N Media capture devices, where N<M and the N media capture devices are configured to capture data characterizing moving objects within the area
202

Assign the N media capture devices to N of the M candidate positions to obtain a device layout, including (M-N) open positions
204

Select a selected media capture device $N_S$ from the device layout
206

Calculate a set of coverage rates characterizing rates of coverage of the moving objects, each coverage rate calculated for a tested device layout in which $N_S$ is positioned at a different one of the (M-N) open positions
208

Select a coverage rate, and corresponding tested device layout, from the set of coverage rates
210

Iterate, including selecting a new $N_S$ from the corresponding tested device layout and calculating a new set of coverage rates in which the new $N_S$ is positioned at different ones of new (M-N) open positions, to thereby obtain a new tested device layout
212

Terminate the iteration upon reaching a termination condition, and select a final device layout from away all tested device layouts
214

DEVICE LAYOUT OPTIMIZATION FOR SURVEILLANCE DEVICES

TECHNICAL FIELD

This description relates to device layout optimization for surveillance systems.

BACKGROUND

Cameras and other media capture devices are often used as part of an overall surveillance system(s) to capture video, audio, or other data related to incidents which occur in a vicinity of such devices. For example, a municipal police department may deploy cameras throughout a city, in order to monitor traffic, and reduce incidents of crime. Similarly, a private enterprise may deploy cameras for similar purposes, such as when cameras are deployed throughout a retail store, in order to learn from patterns of behaviors for shoppers.

It is possible to deploy these and other types of monitoring systems and associated surveillance devices on a large scale, and thereby capture a large quantity of monitoring data across large geographical areas. For such surveillance systems, however, finite resource limits will apply. For example, only a specific number of cameras may be available, or only a limited quantity of human resources may be available to physically transport and install cameras, or there may be bandwidth or other network-related limitations with respect to how much surveillance data can be collected, transmitted, and stored. Also, when available resources are deployed sub-optimally, then redundant or otherwise non-useful information may be captured, and/or valuable information may be missed, or other inefficiencies may occur.

SUMMARY

The present description relates to techniques for optimizing a layout of available cameras or other surveillance devices within a defined geographical area. More particularly, a coverage rate of items being monitored over time (e.g., automobiles in traffic, or individuals walking), relative to a total number (or larger set) of items within the geographical area, may be optimized for a given quantity of surveillance resources.

For example, a given number of cameras may be deployed within the geographical area in a layout that maximizes the coverage rate. In a related example, a defined coverage rate may be reached using a minimum number of cameras. In further related examples, in response to a change in items being monitored (e.g., in response to a new traffic pattern for traffic surveillance systems), a minimum number of cameras may be re-located in order to maintain a desired or maximum coverage rate.

In more detail, for M available candidate positions for N cameras (where N may represent a maximum number of available cameras, a minimum number of cameras to be moved, or a potential number of cameras needed to achieve a desired, minimum coverage rate), an initial set of a number N of the M available candidate positions may be selected (e.g., at random), and then the N cameras may be placed at each selected candidate position, and a corresponding coverage rate for the resulting layout may be calculated. Then, one of the N cameras may be selected and repositioned at each of the previously-unselected candidate positions, and a corresponding coverage rate may be recalculated for each resulting layout, and one of these tested layouts may be selected. The process of selecting one of the cameras, moving it to each remaining/available candidate position, testing a coverage rate for each resulting layout, and selecting one such layout, may be repeated iteratively. Iterations may continue until, e.g., coverage rates converge, and/or a maximum number of iterations is reached.

According to one general aspect, a computer program product is tangibly embodied on a non-transitory computer-readable storage medium. The computer program product includes instructions that, when executed, are configured to cause at least one processor to determine M candidate positions within an area for deployment of N media capture devices, where N<M and the N media capture devices are configured to capture data characterizing moving objects within the area, and assign the N media capture devices to N of the M candidate positions to obtain a device layout, including (M-N) open positions. The instructions, when executed, are further configured to select a selected media capture device $N_S$ from the device layout, calculate a set of coverage rates characterizing rates of coverage of the moving objects, each coverage rate calculated for a tested device layout in which $N_S$ is positioned at a different one of the (M-N) open positions, and select a coverage rate, and corresponding tested device layout, from the set of coverage rates. The instructions, when executed, are further configured to iterate, including selecting a new $N_S$ from the corresponding tested device layout and calculating a new set of coverage rates in which the new $N_S$ is positioned at different ones of new (M-N) open positions, to thereby obtain a new tested device layout, terminate the iterating upon reaching a termination condition, and select a final device layout from among all tested device layouts.

According to another general aspect, a computer-implemented method for executing instructions stored on a non-transitory computer readable storage medium includes determining M candidate positions within an area for deployment of N media capture devices, where N<M and the N media capture devices are configured to capture data characterizing moving objects within the area, and assigning the N media capture devices to N of the M candidate positions to obtain a device layout, including (M-N) open positions. The computer-implemented method further includes selecting a selected media capture device $N_S$ from the device layout, calculating a set of coverage rates characterizing rates of coverage of the moving objects, each coverage rate calculated for a tested device layout in which $N_S$ is positioned at a different one of the (M-N) open positions, and selecting a coverage rate, and corresponding tested device layout, from the set of coverage rates. The computer-implemented method further includes iterating, including selecting a new $N_S$ from the corresponding tested device layout and calculating a new set of coverage rates in which the new $N_S$ is positioned at different ones of new (M-N) open positions, to thereby obtain a new tested device layout, terminating the iterating upon reaching a termination condition, and selecting a final device layout from among all tested device layouts.

According to another general aspect, a system includes at least one processor, and instructions recorded on a non-transitory computer-readable medium, and executable by the at least one processor. The system includes a parameter handler configured to cause the at least one processor to receive a value M for candidate positions within an area, and a value N for media capture devices to be deployed within the area, where N<M and the N media capture devices are configured to capture data characterizing moving objects within the area, and a candidate position selector configured to cause the at least one processor to determine locations for the M candidate positions along pathways within the area defining potential routes for the moving objects. The system further includes a coverage rate calculator configured to cause the at least one processor to calculate a coverage rate for a device layout of the N media capture devices among the M candidate positions, including calculating the coverage rate as a ratio of the moving objects captured by the N media capture devices in the device layout to a total number of the moving objects in the area within a defined period of time, and a layout selector configured to cause the at least one processor to iteratively test different device layouts of the N media capture devices among the M candidate positions, based on corresponding coverage rates calculated by the coverage rate calculator for each tested device layout, until a termination condition is reached and a final device layout of the tested device layouts is selected.

The details of one or more implementations are set forth in the accompanying drawings and the description below. Other features will be apparent from the description and drawings, and from the claims.

BRIEF DESCRIPTION OF THE DRAWINGS

FIG. 2 is a flowchart illustrating example operations of the system of FIG. 1.

DETAILED DESCRIPTION

Figure 1:
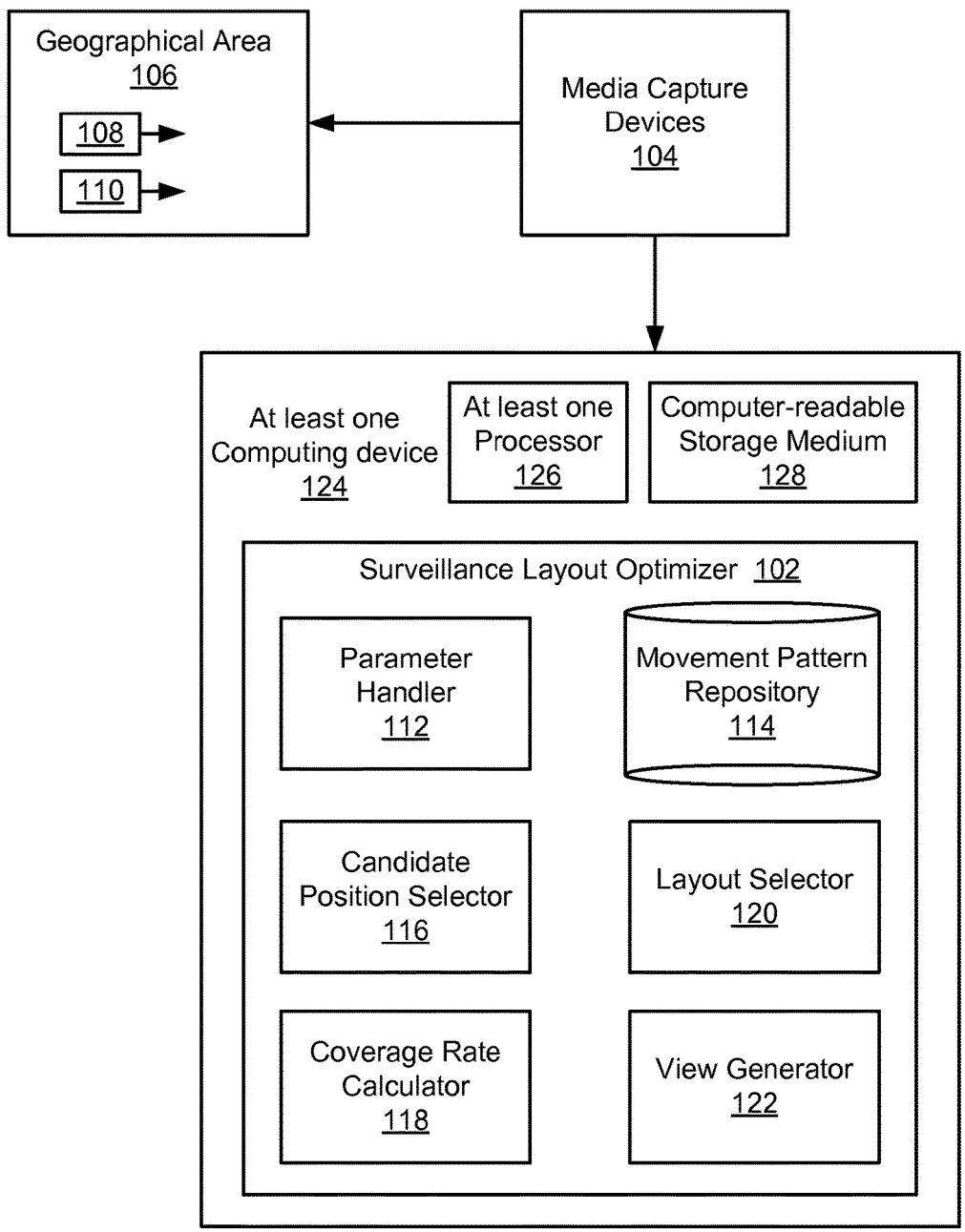
FIG. 1 is a block diagram of a system for surveillance device layout optimization.

FIG. 1 is a block diagram of a system 100 for surveillance device layout optimization. Specifically, as illustrated, a surveillance layout optimizer 102 may be configured to facilitate effective surveillance of a geographical area 104, using a plurality of media capture devices 106. More specifically, as referenced above and described in detail below, the surveillance layout optimizer 102 may be configured to select a plurality of physical locations within the geographical area 104 at which each of the available media capture devices 106 can be deployed, where the resulting physical deployment locations are selected from among a larger number of potential candidate positions for deployment within the geographical area 104. In this way, the media capture devices 106 may be deployed within the geographical area 104 quickly and efficiently, in a manner that utilizes the available media capture devices 106 in a cost effective and time effective manner.

In practice, the geographical area 104 should generally be understood to represent virtually any location, where the definition or boundaries of any such location may be set in any conventional or convenient manner. For example, the geographical area 104 may be as small as a single building, or smaller, or may be as large as an entire city, or larger. Thus, in the former case, the geographical area 104 may be defined by the structure of a particular building, including, e.g., walls, floors, hallways, elevators, stairwells, or rooms. In the latter case, the geographical area 104 may be defined by city boundaries, latitude/longitude/altitude data, or street names. By way of further example, the geographical area 104 may represent a group of highways, railroads, or a body of water and associated shipping lanes.

In these and various other implementations, it is assumed that the media capture devices 106 are deployed within, or otherwise positioned to capture or record, some or all of the geographical area 104. In general, the media capture devices 106 may represent virtually any device operable to record or otherwise capture the moving objects 108, 110 or other occurrences occurring within the geographical area 104, and to output corresponding media files for storage and subsequent review by a user of the system 100.

In many of the examples in the following description, the media capture devices 106 are described as including video cameras configured to capture video and associated audio of events within the geographical area 104, for storage as corresponding audio/video files. Of course, such examples are not intended to be limiting, and the media capture devices 106 should be understood to represent or include, e.g., audio recording devices, still image recording devices, devices for recording a speed, size, or weight of an object, devices for recording seismic activity, devices for detecting indications of certain chemicals, biological agents, or radiation or virtually any other type of sensor operable to record digital media files containing information characterizing events transpiring within the geographical area 104.

In many cases, the media capture devices 106 may be deployed within the corresponding geographical area 104. For example, the media capture devices 106 may represent cameras positioned and installed at a plurality of defined locations within the geographical area 104. For example, cameras may be installed at various locations throughout a building, or along a plurality of streets (e.g., on adjacent buildings, on utility poles, or together with traffic lights). In many cases, the media capture devices 106 may be deployed based at least in part on a type and range of coverage provided by individual ones of the media capture devices 106. For example, cameras may be deployed at regular intervals along a city street, and at distances that minimize unnecessary or redundant overlap of coverage areas of the individual cameras. However, it is not required that the media capture devices 106 provide a complete coverage of all portions or sub-areas of the geographical area 104. For example, the media capture devices 106 may be positioned at locations within the geographical area 104 that have been determined to be most likely to capture moving objects of interest of the moving objects 108, 110. Thus, in some implementations, it will be appreciated that it may be practical or desirable to define the geographical area 104 in terms of a coverage area provided by the media capture devices 106.

In additional or alternative implementations, the media capture devices 106 need not be deployed directly within the geographical area 104, and may instead simply be positioned to provide coverage thereof from within an adjacent area. Further, the media capture devices 106 need not be installed at stationary positions, and may include mobile or moveable media capture devices, such as media capture devices deployed using satellite, drones or other manned or unmanned aerial vehicles, or automobiles or other land-based vehicles. Of course, the media capture devices 106 should also be understood to include any of the various combinations of the various types of media capture devices referenced above, and/or any of the described deployment methods, or variations thereof.

Given the wide-ranging nature of the geographical area 104, and of the media capture devices 106, as just described, it will be appreciated that the types of moving objects and associated events or other occurrences within the geographical area 104 and captured by the media capture devices 106 may be similarly diverse. That is, in the example of FIG. 1, as illustrated, it is assumed that a plurality of moving objects traverse the geographical area 104, illustrated in the simplified example of FIG. 1 as moving objects 108, 110. From the above discussion of the geographical area 104 and the media capture devices 106, it will be appreciated that the moving objects 108, 110 may generally represent virtually any object having physical mobility within the geographical area 104. For example, in many of the example implementations discussed below, the moving objects 108, 110 may represent automobiles or other vehicle traffic traversing roadways within a city. In other example implementations, the moving objects 108, 110 may represent individuals walking, on bicycles, scooters, or other modes of transportation, or any other manned or unmanned vehicle or object that might move or be moved within any of the various types of geographical areas described above.

Hypothetically, or ideally, if no constraints existed on a quantity of media capture devices, human resources to deploy media capture devices, and processing power to process results captured by the media capture devices, then it would be possible simply to deploy as many media capture devices as needed, at any necessary number of locations within the geographical area 104, in order to capture and process recordings of all moving objects therein. Of course, in practical terms, such constraints will always exist, such as when the geographical area 104 is large in size and contains a correspondingly large number of candidate positions at which the media capture devices 106 may be deployed, and when a large number of moving objects frequently traverse a correspondingly large number of pathways (e.g., highways, roads) within the geographical area 104.

Additionally, it may occur that only a limited number of the media capture devices 106 are available for deployment within the geographical area 104. Moreover, even if a relatively large number of media capture devices 106 are available, it is still preferable to deploy a minimally effective number thereof within the geographical area 104. For example, such minimally effective or otherwise optimized deployment of a selected number of the media capture devices 106 may be desirable in order to conserve some of the media capture devices available for deployment in a second geographical area (not shown in FIG. 1). Further, even if a large number of media capture devices are available, human and other resources are necessary to physically install or relocate the various media capture devices at or among the various candidate positions within the geographical area 104.

Thus, as described in detail below, the surveillance layout optimizer 102 is configured to deploy, and, as needed, adjust deployments of, the media capture devices 106, in a manner that minimizes or eliminates redundancies in capturing the moving objects 108, 110 within the geographical area 104. In other examples, it may be inefficient or undesirable to position a media capture device in a portion of the geographical area 104 in which a small number of moving objects rarely appear, relative to other areas of the geographical area 104.

In short, the surveillance layout optimizer 102 enables optimal positioning of the media capture devices 106 within the geographical area 104, in order to capture a sufficient majority of the moving objects 108, 110, using a defined number of the media capture devices 106. Moreover, in scenarios in which movement patterns of the moving objects 108, 110 within the geographical area 104 change over time, the surveillance layout optimizer 102 may be configured to suggest corresponding minimally effective movements of already-deployed media capture devices 106, in order to re-maximize or otherwise optimize a coverage of the moving objects. Additionally, or alternatively, the surveillance layout optimizer 102 may be configured to suggest a number of media capture devices 106 necessary to achieve a desired, specified coverage rate for moving objects within the geographical area 104. These and other features and advantages of the surveillance layout optimizer 102 are described in more detail, below, or would be apparent from the following description.

In the example of FIG. 1, the surveillance layout optimizer 102 is illustrated as including a parameter handler 112, which is configured to receive all relevant parameters and other input that may be required to calculate an optimized layout for the media capture devices 106 within the geographical area 104. Such parameters may include, for example, a number N of media capture devices 106 that are available for deployment, a number M of available candidate positions within the geographical area 104 at which the N media capture devices 106 might be deployed, or a desired coverage rate that is expected to be achieved with respect to a portion or percentage of the moving objects 108, 110 that are captured by the deployed media capture devices 106, relative to a total number of moving objects 108, 110 within the geographical area 104. The parameter handler 112 may also receive definition of the geographical area 104 (e.g., boundaries thereof, and streets included therein, perhaps from a geographical information system (e.g., (GIS), not shown in FIG. 1), or new/modified movement patterns (e.g., traffic patterns) for the various moving objects 108, 110. Various other types of parameters that may be handled by the parameter handler 112 are described below, or would be apparent.

A movement pattern repository 114 represents a database or other repository for storing information regarding movement patterns of the moving objects 108, 110 within the geographical area 104, as well as information regarding individual ones of the moving objects 108, 110. Generally speaking, the movement pattern repository 114 is assumed to contain, or represent, data regarding a total number of moving objects 108, 110 within a specified time period, along with related information regarding various positions of movements of the moving objects 108, 110, and associated movement patterns or routes available within the geographical area 104 and within the relevant time period. In this way, as described in more detail below, the movement pattern repository 114 provides an absolute point of comparison for use in evaluating a layout optimization calculated by the surveillance layout optimizer 102. For example, such a point of comparison may be utilized to calculate a relative coverage rate representing a percentage or quantity of a subset of the moving objects 108, 110 that will be captured in the context of a particular device layout, relative to a total number of moving objects 108, 110 that actually existed within the geographical area 104 during the relevant timeframe.

In the example, it is assumed that the movement pattern data providing the point of comparison within the movement pattern repository 114 can be obtained from one or more suitable sources, which do not, by themselves, provide the type of coverage desired for the implementation of the system 100 of FIG. 1 and provided by the media capture devices 106. For example, in the context of vehicle traffic for vehicles moving along roads within a city, the movement pattern repository 114 may be populated using movement pattern data captured through the use of global positioning system (GPS) devices that are installed in individual vehicles, such as taxi cabs operated by taxi cab businesses. As described in detail below, by considering such actual positional information for a particular taxi moving through the geographical area 104, it is possible to determine an extent to which the same taxi was, or would have been, or would be captured in a given device layout for the media capture devices 106. Resulting coverage rate calculations characterizing an efficacy of the associated device layout may then be extrapolated therefrom.

Of course, data for the movement pattern repository 114 may be obtained from other appropriate or available sources, such as data captured by previously-deployed cameras or other position sensors. Moreover, it will be appreciated that data for the movement pattern repository 114 may be captured and formatted appropriately for any corresponding implementation of the geographical area 104 and the moving objects 108, 110. For example, in the context of employees or other individuals moving throughout a large building or campus, the movement pattern repository 114 may capture data for individuals based on ID badges worn by those individuals.

A candidate position selector 116 is configured to identify a number M of potential candidate positions within the geographical area 104 at which the N available media capture devices 106 may be deployed. For example, a value for the number M may be provided by the user of the system 100, by way of the parameter handler 112, or a candidate position selector 116 may calculate a value for the M candidate positions, based on characteristics of the geographical area 104, as described in more detail, below. For a determined value of the number M, the candidate position selector 116 may identify actual physical locations (e.g., latitude/longitude coordinates along a street within a city, or a location of a particular building or other physical object along the street) at which a specific media capture device 106 might be installed. As described in more detail below, such candidate positions may be selected based on an attempt to maximize a coverage area and coverage rate of the deployed N media capture devices 106, without requiring an excessive or unacceptable value for the number N.

A coverage rate calculator 118 is configured to utilize data from the movement pattern repository 114 to calculate a coverage rate for individual media capture devices within a particular device layout, as well as for the device layout as a whole. As referenced above, the term coverage rate in this context generally refers, for example, to a ratio of a number of vehicles or other moving objects 108, 110 that have passed by deployed media capture devices 106 within a device layout being tested, relative to a total number of vehicles or other moving objects 108, 110 within the area 104 and within a defined period of time.

A layout selector 120 is configured to generate a number of different device layouts for a number N of the media capture devices 106, and for a selected set M of candidate positions. As described in detail below, the layout selector 120 may leverage calculations of the coverage rate calculator 118 to calculate a coverage rate for each tested device layout, or a selected subset thereof. In this way, an optimized device layout may be obtained.

In the following examples, it is generally assumed that the geographical area 104 is relatively large, and/or contains a number of candidate positions M that is large relative to a number N of the media capture devices 106. Consequently, a solution space of possible device layouts in which the M media devices are deployed at a corresponding number N of the available M candidate positions may be very large. In such scenarios, it may be impractical, unacceptable, or virtually impossible to perform an exhaustive calculation of all possible device layouts within the possible solution space of device layouts. In such scenarios, as described in more detail below, e.g., with respect to FIG. 2, the layout selector 120 may execute an iterative process in which different device layouts are calculated based on associated coverage rates, and a best or nearly best device layout/coverage rate is selected as a starting point for a subsequent iteration of device layout/coverage rate calculations. In such scenarios, iterations may continue until a termination condition is reached, at which point a best available device layout/coverage rate may be selected for implementation.

In some implementations, as referenced above and described in detail below with respect to the example of FIG. 7, the number of N of media capture devices 106 may represent a total number of available media capture devices to be deployed. In related examples, as described with respect to FIG. 8, it may be necessary or desirable to redeploy or reposition a subset of already-deployed media capture devices, such as when a movement pattern or other characteristic of the geographical area 104 and/or the moving objects 108, 110 is altered. In such cases, the number N may represent only those media capture devices that should be potentially repositioned or redeployed as a result of the underlying, instigating change in the geographical area 104 and/or movement patterns of the moving objects 108, 110. In additional or alternative examples, as described in detail below with respect to FIG. 9, the number N may represent a tested number of media capture devices that is considered by the layout selector 120 in an attempt to achieve a desired coverage rate, so that the number N is initially set to the value corresponding to a subset of the total available media capture devices 106, but that subset is increased or decreased in number during subsequent iterations in order to identify a final value for the number N that provides the desired coverage rate.

Also in the example of the surveillance layout optimizer 102 of FIG. 1, a view generator 122 may be configured to provide a graphical user interface (GUI) or other interface for interacting with the user of the system 100. For example, the view generator 122 may provide such a GUI to receive the various parameters handled by the parameter handler 112.

Such a GUI also may be used to capture data stored within the movement pattern repository 114, which could of course also be obtained from an appropriate interface with a separate system containing the desired data. The provided user interface also may include a visualization of the geographical area 104 and included candidate positions and/or deployed or potentially deployed ones of the media capture devices 106, reports or other analytics regarding calculated coverage rates or device layouts, or any other visual or textual information that may be useful to the user of the system 100 in operating the surveillance layout optimizer 102.

For example, the user of the system 100 may be permitted or enabled to modify selected candidate positions or device layouts, such as when the user has independent knowledge regarding a desirability, or lack thereof, of a particular candidate position or actual deployment location for one of the media capture devices 106. More particularly, for example, the user may be permitted to identify required candidate positions or deployment locations that are included at such within the tested device layouts considered by the layout selector 120, which may both reduce a total solution space, while ensuring inclusion of deployment locations that are considered critical by the user.

Of course, the system 100 of FIG. 1 represents a highly simplified view of example implementations of the surveillance layout optimizer 102. For example, the system 100 of FIG. 1 illustrates at least one computing device 124 that includes at least one processor 126 and non-transitory computer readable storage medium 128. That is, the example of FIG. 1 generally illustrates that one or more computing devices, perhaps in communication with one another by way of an appropriate computer network, may include one or more processors, which may execute in parallel in order to support operations of the surveillance layout optimizer 102. More specifically, one or more such processors may access and implement corresponding computer code or other instructions stored on the non-transitory computer readable storage medium 128, in order to thereby provide the surveillance layout optimizer 102.

Of course, many other potential elements of the at least one computing device 124 are not explicitly illustrated in the example of FIG. 1, but would be apparent to one of skill in the art. For example, it will of course be appreciated that an appropriate display device may be utilized by the view generator 122, e.g., to provide a view of an optimized layout determined by the surveillance layout optimizer 102, for viewing or other consumption by the user of the system 100. Similarly, the view generator 122 may also provide a graphical user interface (GUI) or other interface by which a user of the system 100 may be enabled to operate the parameter handler 112.

Further, although the surveillance layout optimizer 102 is illustrated in FIG. 1 as a single element including various sub-elements 112-122, various embodiments may be implemented in which one or more of the various sub-elements 112-122 are implemented separately (e.g., on separate, communicating computing devices of the at least one computing device 130). For example, although the movement pattern repository 114 is illustrated in FIG. 1 as part of the surveillance layout optimizer 102, in various implementations, the movement pattern repository 114 may be implemented and stored using otherwise conventional portions of a conventional surveillance system.

Somewhat similarly, although the various sub-elements 112-122 are illustrated and described as separate, discrete components, it will be appreciated that any one such component may be implemented as two or more sub-components. Conversely, in other implementations, it may occur that any two or more of the sub-elements 112-122 may be combined for implementation as a single sub-element of the incident search facilitator 102.

FIG. 2 is a flowchart 200 illustrating example operations of the system 100 of FIG. 1. In the example of FIG. 2, operations 202-214 are illustrated as separate, sequential operations. In various implementations, additional or alternative operations may be included, or one or more of the operations 202-214 may be omitted. In all such implementations, any two or more operations or sub-operations may be executed in a partially or completely overlapping or parallel manner, or in a nested, iterative, branched, or looped manner.

In the example of FIG. 2, M candidate positions within an area for deployment of N media capture devices may be determined, where N is less than M and the N media capture devices are configured to capture data characterizing moving objects within the area (202). For example, as described above, the candidate position selector 116 may identify M candidate positions within the geographical area 104, for deployment of N of the media capture devices 106.

The N media capture devices may then be assigned to N of the M candidate positions to obtain a device layout, including (M−N) open positions (204). For example, in some implementations, the layout selector 120 may assign the available or specified N media capture devices randomly among the available M candidate positions to obtain an initial, random device layout. Since, as referenced, M greater than N, the result is that a number (M−N) of the original M candidate positions will be open, i.e., will not have a media capture device assigned thereto. In the simplified example, for example, M may equal 1000, and N may equal 50, so that 50 media capture devices will be deployed at 50 of the available 1000 candidate positions, leaving 950 open positions.

A selected media capture device $N_S$ may be selected from the device layout (206). For example, the layout selector 120 may select the selected media capture device $N_S$ at random from the initial, random device layout.

A set of coverage rates characterizing rates of coverage of the moving objects may be calculated, where each coverage rate is calculated for a tested device layout in which the selected media capture device $N_S$ is positioned at a different one of the (M−N) open positions (208). For example, the coverage rate calculator 118 may calculate the described set of coverage rates, so that, in the above example, a selected media capture device of the 50 media capture devices initially assigned to a corresponding 50 candidate positions may be selected at random, and placed at each of the remaining 950 open positions. If the coverage rate is calculated for each combination of the selected media capture device and each of the 950 open positions, then (M−N) equals 950 coverage rates may be calculated. Including a coverage rate for the initial, randomly selected device layout, i.e., before movement of the selected media capture device $N_S$, a total number of coverage rates that may be calculated is (M−N)+1.

A coverage rate, and corresponding tested device layout, may be selected from the set of coverage rates (210). For example, the layout selector 120 may select from among the, in the example, 951 calculated coverage rates.

In some implementations, it is not necessary, practical, or desirable to calculate complete values for all potential coverage rates and associated device layouts. In other words, for example, coverage rates may be calculated for only a selected subset of the available (M−N)+1 potential coverage rates that may be calculated. For example, a sampling of the potential device layouts may be performed, and only a sample subset of the total set of (M−N)+1 device layouts/coverage rates may be obtained and utilized for the following operations.

In cases where all coverage rates are calculated, a highest coverage rate may be selected. Alternatively, a coverage rate may be selected using a sampling technique, such as the Gibbs sampling techniques described below.

After storing the selected device layout and corresponding coverage rate, iterations may proceed, including selecting a new selected media capture device $N_S$ from the corresponding, tested device layout, and calculating a new set of coverage rates in which the new $N_S$ is positioned at different ones of new (M−N) open positions, to thereby obtain a new tested device layout (212). In other words, in continuing the example above, out of the total (M−N)+1 open positions and associated device layouts/coverage rates tested in the original iteration, a particular tested device layout/coverage rate is selected. Then, a new, individual $N_S$ selected media capture device is selected and moved to each of the current 950 open candidate positions, and the above-described associated calculations for calculating coverage rates for some or all of these 951 device layouts may be repeated, so that a new, best-available or best-known coverage rate/tested device layout may be selected and stored.

The iterating may be terminated upon reaching a termination condition, and a final device layout may thus be selected from among all tested device layouts (and associated coverage rates) (214). For example, the layout selector may determine a termination condition such as, for example, a maximum number of iterations reached, or a minimum acceptable coverage rate being reached. At that time, the layout selector 120 may select, from among all calculated and stored device layouts/coverage rates, an actual device layout to be deployed within the geographical area 104.

In the examples of FIGS. 3-9, particular use case scenarios are described with respect to urban traffic surveillance cameras, often used to provide urban security and accomplish other police objectives. That is, the media capture devices 106 are considered to include video cameras as urban traffic surveillance cameras positioned above an urban road or street, and used to record photographs and/or video of vehicles passing by. As is known, such photos/videos are very useful for, e.g., tracking illegal behaviors of vehicles (e.g., speeding, running red lights, or breaking other traffic rules). Such use cases are also useful for investigating unsolved crimes, because the photos and videos may be reconstructed and analyzed, e.g., to track a movement of a stolen or criminal vehicle.

Such use cases provide good examples of the types of considerations referenced above. For example, large cities typically require a large number of cameras, and it is very difficult to achieve optimal positioning for camera layouts to obtain a relatively high coverage rate using a relatively small number of cameras.

Additionally, vehicle traffic surveillance scenarios are susceptible to redundancies and other inefficiencies that may occur in poorly selected camera layouts. For example, a camera positioned near an entrance of a cul de sac may provide information that duplicates most or all information captured by a camera positioned within the cul de sac, since it is presumed that vehicles entering/exiting the cul de sac will pass the camera positioned on the adjacent street. Similarly, streets that loop, diverge, or merge may be susceptible to redundant deployment of cameras. Further, in a given urban environment, certain roads may be traveled far less frequently than other roads, so that it may be practical or desirable to focus coverage areas on more frequently traveled roadways.

Thus, typically, a globally high route coverage area or route coverage rate will not be necessary or even desirable. Instead, different route coverage rates should be used in different areas/regions, but such imbalanced coverage areas/rates contribute to a difficulty in designing optimal layouts. Moreover, traffic patterns may change over time, requiring corresponding updates to the device layouts. Still further, other considerations may come into play. In particular, for example, stolen or other criminal vehicles may purposely seek to travel routes in which surveillance is weak, in order to avoid detection or capture, so that it may be necessary or desirable to extend coverage to lightly-used routes, notwithstanding the comments above that such coverage is not, by itself, the most efficient way to achieve an overall high coverage rate.

The features and functions described above with respect to FIGS. 1 and 2, and described in more particular detail with respect to FIGS. 3-9, below, include at least the following advantages with respect to determination of optimized camera layouts in the context of urban traffic surveillance systems. For example, the described techniques inherently consider and account for traffic patterns within an area, e.g., by iteratively exploring a total solution space of potential device layouts. Described techniques also consider, and account for, changes in camera efficiency over time, such as when traffic patterns or other considerations change over time. As described with respect to FIG. 8, it is possible to reposition a small number of cameras to maintain or otherwise achieve a desired level of efficiency. Finally, an imbalanced coverage rate among different areas or regions may be considered by, as described with respect to FIG. 9, providing an ability to set different coverage rates for different areas.

Figure 3:
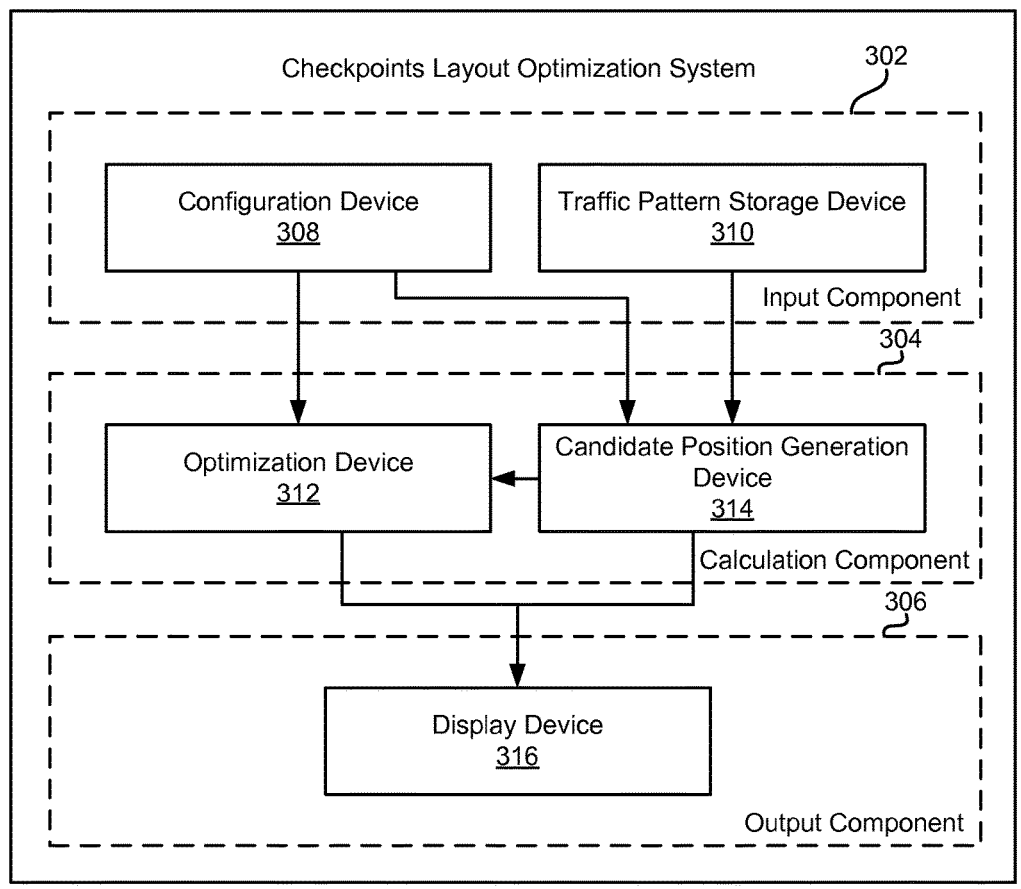
FIG. 3 is a block diagram of a system providing an implementation of the system of FIG. 1 for traffic surveillance.

FIG. 3 is a block diagram of a system 300 illustrating an implementation of a system 100 of FIG. 1 in the context of urban traffic surveillance. In the example, a checkpoint layout optimization system 300 includes an input component 302, a calculation component 304, and an output component 306.

As shown, the input component 302 includes a configuration device 308, which may implement, or correspond generally to, the parameter handler 112 of FIG. 1, and which may be used to collect all system parameters. For example, the configuration device 308 may be utilized to receive an identification of a traffic pattern to consider, a number of cameras that are available or desired to be used, or a minimum coverage rate that is desired.

A traffic pattern storage device 310 corresponds generally to, or implements, the movement pattern repository 114 of FIG. 1. That is, the traffic pattern storage device 310 may be used to provide a database of traces of vehicles over time during a recent history of one or more geographical areas under surveillance. In the example, the stored traffic pattern data may include recent paths of specific vehicles, including geographical coordinates and associated timestamps. As referenced above, such data may be obtained from GPS devices stored on existing vehicles, such as those installed by taxi or bus companies, or by companies providing mapping or street view information, or other commercial interests.

The calculation component 304 includes an optimization device 312 and a candidate position generation device 314. The candidate position generation device 314 may be configured to separate roads into intervals, where each interval serves as a candidate position for deployment of a camera, as described below with respect to FIG. 4. Meanwhile, the optimization device 312 may be configured to calculate the optimal layout for the cameras being deployed, as described above with respect to the layout selector 120 and the coverage rate calculator 118. As described, the optimization device 312 may implement, e.g., optimization of camera layout for a high coverage rate given a fixed number of cameras (FIG. 7), an optimization of camera layout to minimize camera movements in response to a new traffic pattern for an existing device layout (FIG. 8), and a determination of a lowest number of cameras required to obtain a target coverage rate while providing an otherwise optimized camera layout (FIG. 9).

Finally in FIG. 3, the output component 306 is illustrated as including at least a display device 316. The display device 316 may be utilized to display, on behalf of the output component 306, and by way of non-limiting example, an optimization result that includes a number of cameras, a position of each camera, and an estimated coverage rate that can be achieved by the provided camera layout. In various implementations, the display device 316 may include, e.g., a desktop application that runs on a desktop or a laptop computer, a mobile application running on a Smartphone or a tablet, a webpage displayed using a corresponding web browser, or even a printer that prints optimization results.

Figure 4:
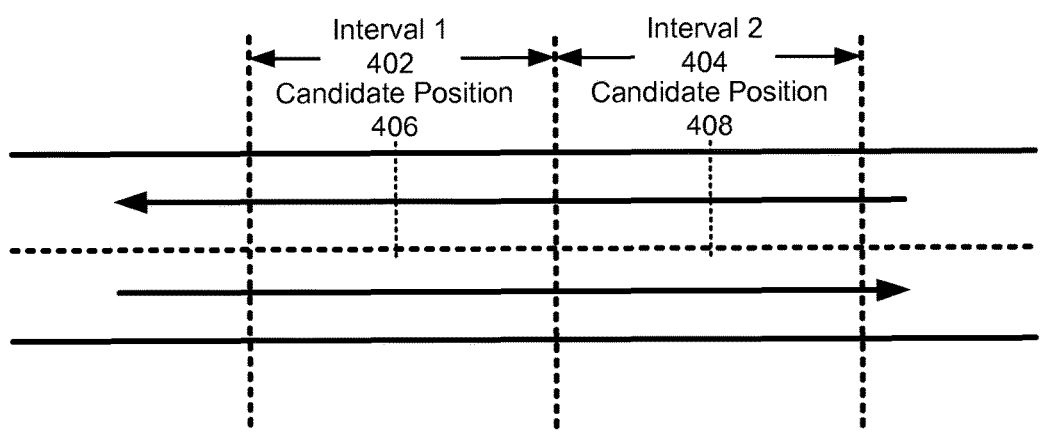
FIG. 4 is a simplified map illustrating a first street segment observed by the surveillance system of FIG. 3.

As referenced above, FIG. 4 illustrates a simplified map 400 of a portion of a road (or other pathway(s)), in which a first interval 402 and a second interval 404 are identified. As also shown, a candidate position 406 is located at a center point of the first interval 402, while a candidate position 408 is illustrated at a center position of the second interval 404.

As referenced above with respect to the candidate position generation device 314, a road such as the road 400 may be separated into intervals, such as the intervals 402, 404, and each interval can be assigned a candidate position for a corresponding camera to be deployed. For relatively large intervals, the camera may be placed at a center point of the intervals, as illustrated with respect to FIG. 4. A size of each interval 402, 404 may be set as a parameter using the configuration device 308 (or the parameter handler 112 of FIG. 1). In general, the smaller the interval, the more accurate the achieved result, but at a cost of requiring a higher number of intervals overall.

In the example of FIG. 4, it may be assumed that a given camera covers only one direction and one lane of the illustrated road 400. As the illustrated road 400 includes two lanes, (left to right, and right to left) monitoring traffic flow within interval one will require two cameras, one camera for each direction of traffic (similar comments would apply for cameras installed within the second interval 404).

In some implementations, a global interval length for all intervals of a given road may be set, so that all intervals have equal lengths. In additional or alternative implementations, different intervals may be assigned different interval lengths, and/or different interval lengths may be assigned for different roads. As already described, all such parameters may be assigned using the configuration device 308 of FIG. 3 or the parameter handler 112 of FIG. 1. In this way, for the set of roads in the geographical area 104, road segmentation may be obtained for each road to obtain a total list of intervals, where each interval contains one or more candidate positions for cameras to be deployed.

Figure 5:
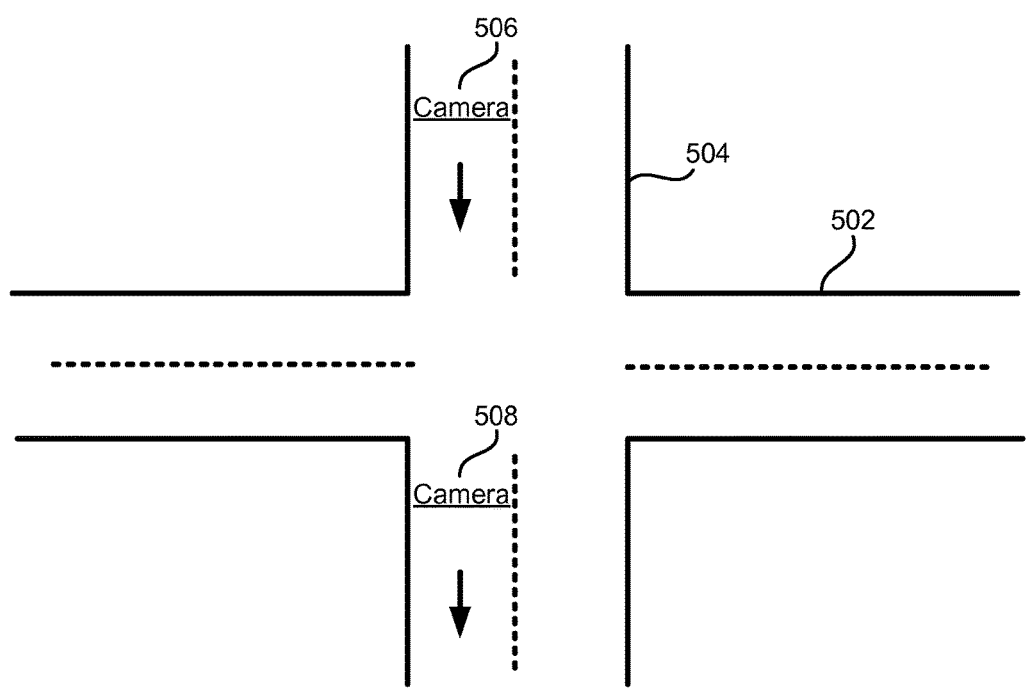
FIG. 5 is a second simplified map illustrating a second street segment observed by the surveillance system of FIG. 3.

While FIG. 4 is described above with respect to obtaining candidate positions for deploying cameras, FIG. 5 illustrates a simplified map 500 of an intersection that is used by way of example to explain techniques for evaluating a route coverage rate for a given camera layout.

In the example of FIG. 5, a first road 502 intersects with a second road 504. A camera 506 is positioned to capture traffic flow along one lane of the road 504, while the second camera 508 is positioned further along the road 504, to capture traffic flow within the same lane, but subsequent to the intersection of the roads 502, 504 (so that, as will be apparent, the camera 508 may be likely to capture traffic turning into the lane of the camera 508 from the road 502, as well as traffic continuing past the camera 506 along the road 504 to the camera 508.

Figure 6:
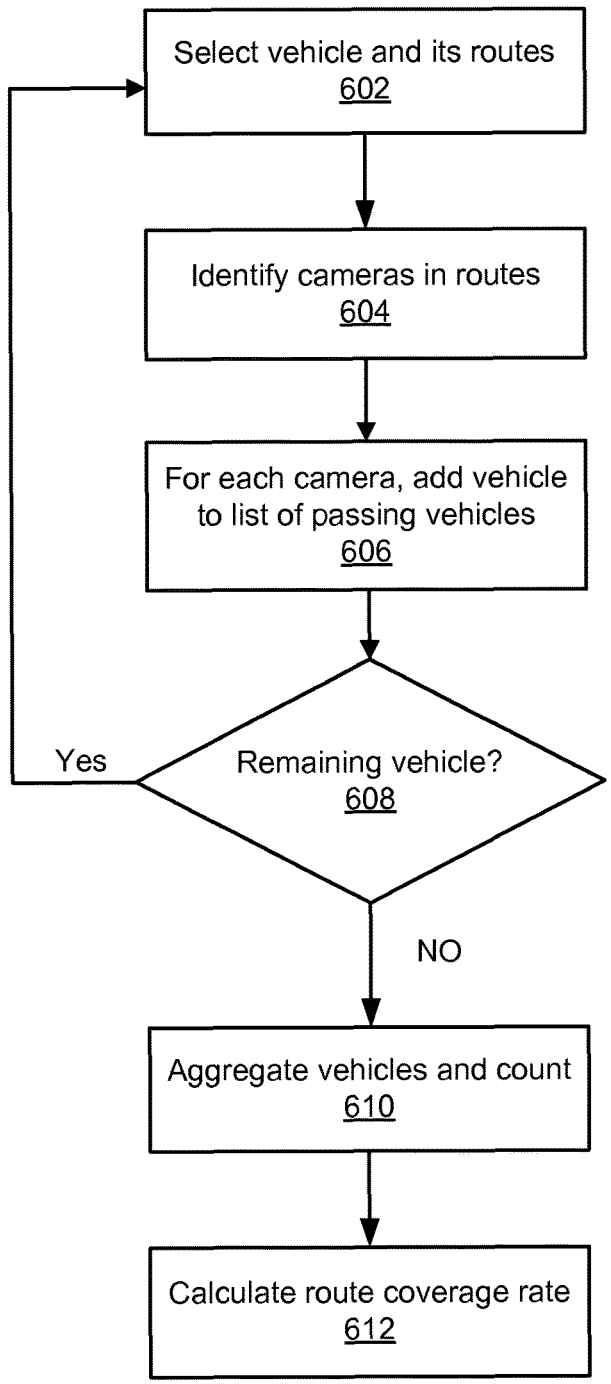
FIG. 6 is a flowchart illustrating example operations for calculating a coverage rate achieved by a current device layout.

As referenced above, FIG. 6 is a flowchart 600 illustrating example techniques for calculating route coverage rates, e.g., for the intersection of FIG. 5 or for any desired camera layout. In the example of FIG. 6, a vehicle and its route may be selected (602), e.g., from the traffic pattern storage device 310 (or the movement pattern repository 114).

Subsequently, all cameras that are deployed, or going to be deployed, in the route of this vehicle may be identified (604). For each camera, the vehicle may be added to a corresponding list of passing vehicles (606). For relevant remaining vehicles within the traffic pattern storage device 310, operation 602, 604, 606 may be repeated, until no remaining vehicles are stored (608).

Subsequently, the vehicles from each camera may be aggregated. That is, the listed vehicles for each camera may be aggregated into a single, complete list, and a total number of vehicles having passed the cameras can be counted (610). With this information, the route coverage rate may be calculated (612). Specifically, for example, the route coverage rate may be calculated as being equal to a ratio of a number of vehicles that have passed by the cameras in question, relative to a total number of vehicles. As described, the total number of vehicles may be obtained from GPS systems within vehicles within the area, from mapping or navigation applications, or other available sources.

As shown in Pseudo Code 1, a data structure for each camera may be expressed as shown. Specifically, for each camera, a camera ID may be defined. A vehicle list for the camera may be defined, in which a vehicle ID serves as a key and a value of the vehicle list is an integer that is implemented to count a frequency with which a given vehicle passes by the camera in question.

| Pseudo Code 1 |
|---|
| ## Data Structure Definition |
| ## Camera |
| ## { |
| ##     CameraID, -- integer type |
| ##     VehicleList, -- dictionary type in which the key is the vehicle id and |
| ##         -- the value is an integer to count how frequently this |
| ##         -- vehicle passes by this camera. |
| ## } |

Figure 7:
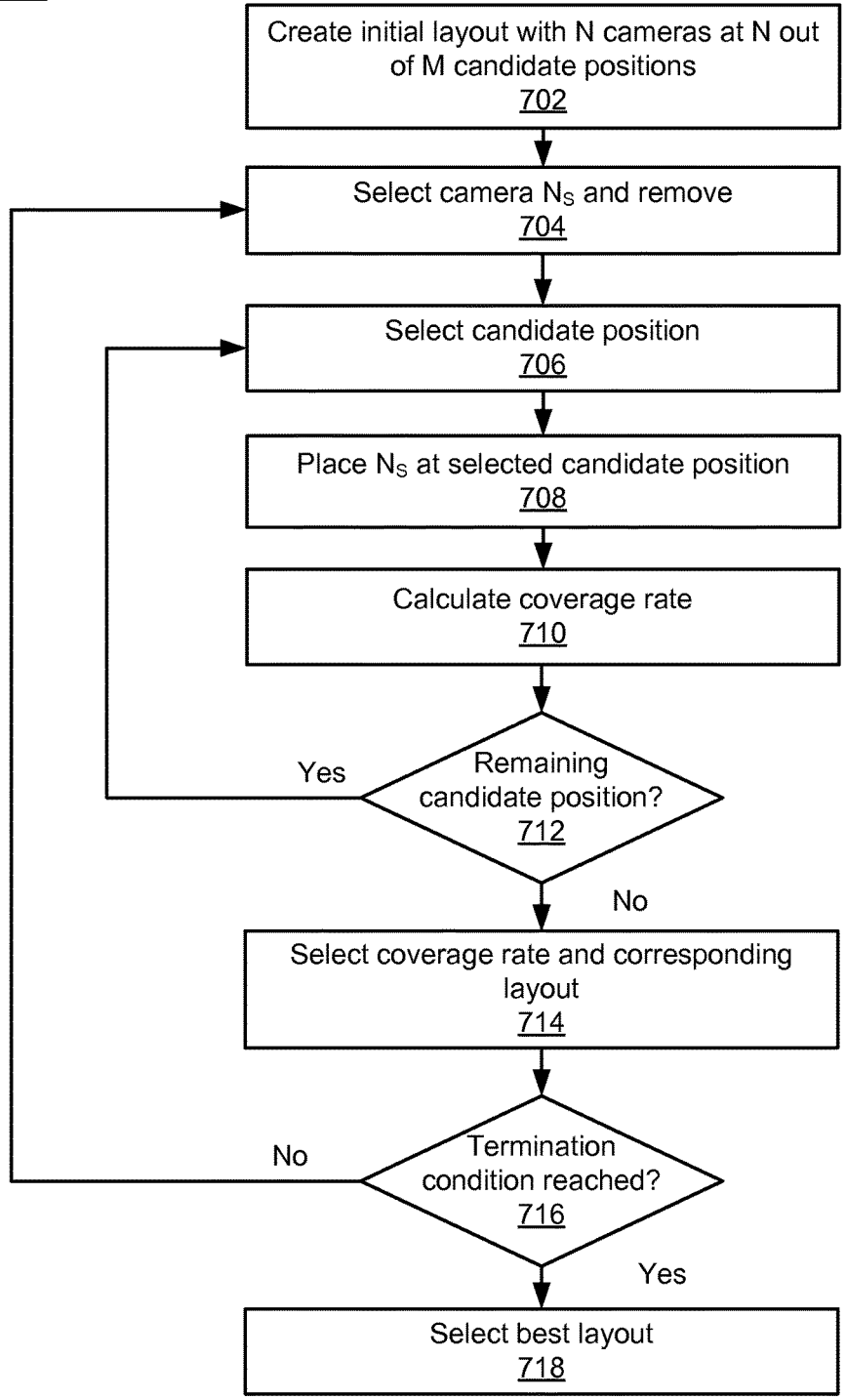
FIG. 7 is a flowchart illustrating operations for optimizing a surveillance device layout for a number N of cameras to be deployed (or re-deployed), based on coverage rates calculated using the techniques of FIG. 6.

FIG. 7 is a flowchart 700 illustrating more detailed example operations for calculating an optimized camera layout. More specifically, the flowchart 700 illustrates techniques for calculating an optimized camera layout when a fixed number N of cameras is known, and it is desired to utilize the fixed number N of cameras to achieve a highest, or nearly highest, coverage rate.

In the example of FIG. 7, an initial layout may be created with N cameras deployed at N out of M defined candidate positions (702). A selected camera $N_S$ may then be selected and removed (704).

A candidate position of the (M−N) open candidate position may be selected (706), and the selected $N_S$ may be placed at the selected candidate position of the open candidate positions (708). Then, a coverage rate for the resulting camera layout may be calculated (710), using the techniques of FIG. 6, or other appropriate technique.

As long as further candidate positions remain from the available open candidate positions (712), operations 706, 708, 710 may be iteratively repeated. Once all of the open candidate positions have been evaluated (712), a coverage rate and corresponding camera layout may be selected from among all the various calculated coverage rates (714).

In some implementations, as referenced above, a selection of calculated coverage rates may be as simple as selecting the highest available calculated coverage rate. In some cases, however, it is possible that an overall optimization process may become fixed at a local optimum value, which may not be the largest possible optimal value for a coverage rate.

Consequently, as described in detail below, various other techniques may be utilized to select from among the various calculated coverage rates (and associated camera layout). For example, Gibbs sampling may be performed over the calculated coverage rate, in order to obtain a selected coverage rate and associated camera layout.

If a termination condition has not yet been reached (716), then operations 704-714 may continue iteratively. On the other hand, if a termination condition has been reached, then an optimal camera layout may be selected from among the calculated camera layouts, or may be implemented based on a most recent camera layout calculated by the iterative process.

In other words, for example, if a termination condition is defined based on a total number of iterations of the processes of the flowchart 700 of FIG. 7, then a final calculated coverage rate and associated camera layout will not necessarily represent a best-available camera layout, and it may be necessary or desirable to evaluate some number or percentage of previously-calculated coverage rates/camera layouts to select a best-available option.

In other examples, however, a termination condition may be specified based on achieving a coverage rate that is repeated, or substantially repeated, after a certain number of iterations of the flowchart 700. In such cases, it may be assumed that the thus-settled value for the coverage rate may represent an optimal value, and may therefore be selected as being associated with the best-available camera layout. Of course, other types of termination conditions, or various combinations thereof, may be utilized, as would be appropriate.

In a simplified example to illustrate the optimization process of FIG. 7, it may occur that it is required to place N=2 cameras [C1,C2] among 5 candidate positions [P1,P2,P3,P4,P5]. Following the operations of FIG. 7, it may occur that positions P2 and P3 are randomly selected for an initial layout, so that camera C1 is placed at position P2, and camera C2 is positioned at position P3. Thereafter, camera C2 may randomly be selected for removal, so that the layout contains only C1, still positioned at P2.

Then, the remaining positions are [P1,P3,P4,P5]. Therefore, camera C2 will be placed at each of these positions, and a corresponding coverage rate may be calculated. In the example, it may occur that the following coverage rate for these positions are: [P1:0.1,P3:0.2,P4:0.4,P5:0.1].

As mentioned above, it is possible simply to select the highest coverage rate of P4=0.4. However, as also referenced, this approach may result in selecting a local optima that is not as high as an overall optimal coverage rate. Consequently, Gibbs sampling may be utilized to choose a position.

In the example, Gibbs sampling may indicate that the probability of choosing P1 is =to 0.1/(0.1+0.2+0.4+0.1), while a probability of choosing P3 is =to 0.2/(0.1+0.2+0.4+0.1). The probability that P4 is chosen is =to 0.4/(0.1+0.2+0.4+0.1), and the probability of choosing P5 is =to 0.1/(0.1+0.2+0.4+0.1). If the Gibbs sampling ultimately returns P1 as the selected position, the resulting camera layout would be camera C1 and position P2, and camera C2 at position P1, with a corresponding coverage rate of 0.1. This coverage rate and the just-mentioned camera layout may be stored for possible further selection as the optimal camera layout.

The processes of FIGS. 6, 7 may iteratively be repeated by randomly removing one of the cameras C1,C2, and continuing the approach just described. If the termination condition is defined as a maximum number of iterations set to 10, then, after the termination condition is reached, 10 layouts and 10 coverage rates will have been stored. In this example, the final result would be a camera layout with the highest coverage rate among the 10 stored layouts.

In the preceding examples, the Gibbs sampling technique is described as one possible example sampling method that may be utilized. The Gibbs sampling technique, by itself, is a well-known example of the Markov chain Monte Carlo optimization method. More specifically, the Gibbs sampling technique is essentially an algorithm to obtain an observation from a specific multivariate probability distribution. In the example of FIG. 7, the multivariate probability distribution has a random variable corresponding to a candidate position for a camera, and a probability of each candidate position is obtained from the coverage rate. In other words, finding a target position for moving a camera using Gibbs sampling implies that a probability of moving the camera to a good position (high coverage rate) is higher than a probability of moving cameras to a bad position (low coverage rate).

Figure 8:
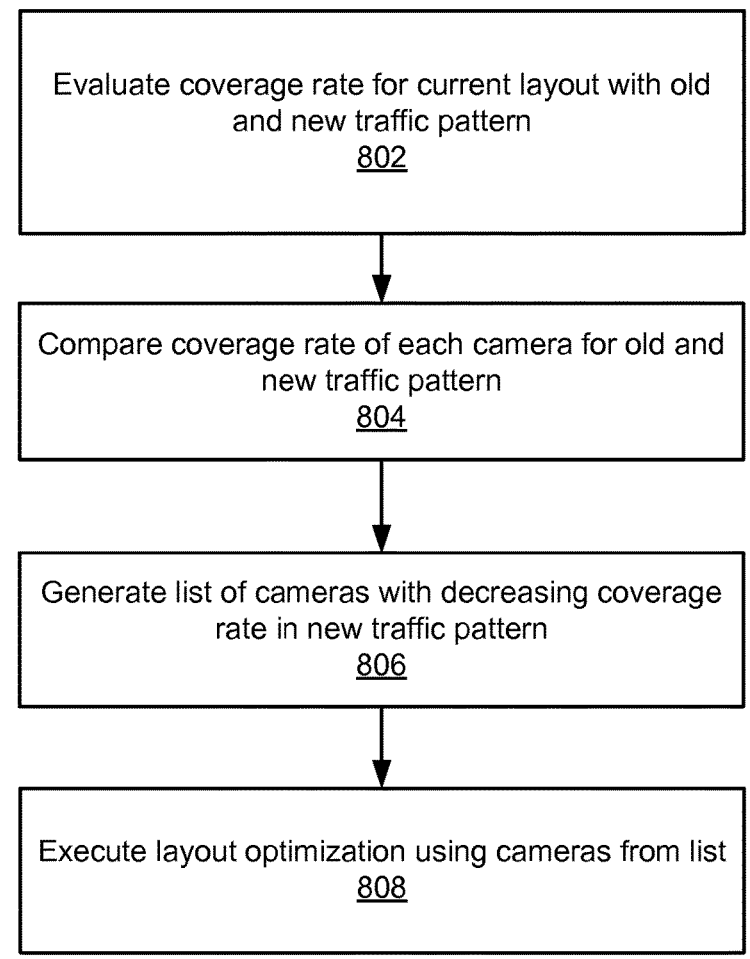
FIG. 8 is a flowchart illustrating example operations for adjusting an optimized device layout, based on updated traffic patterns.
Figure 9:
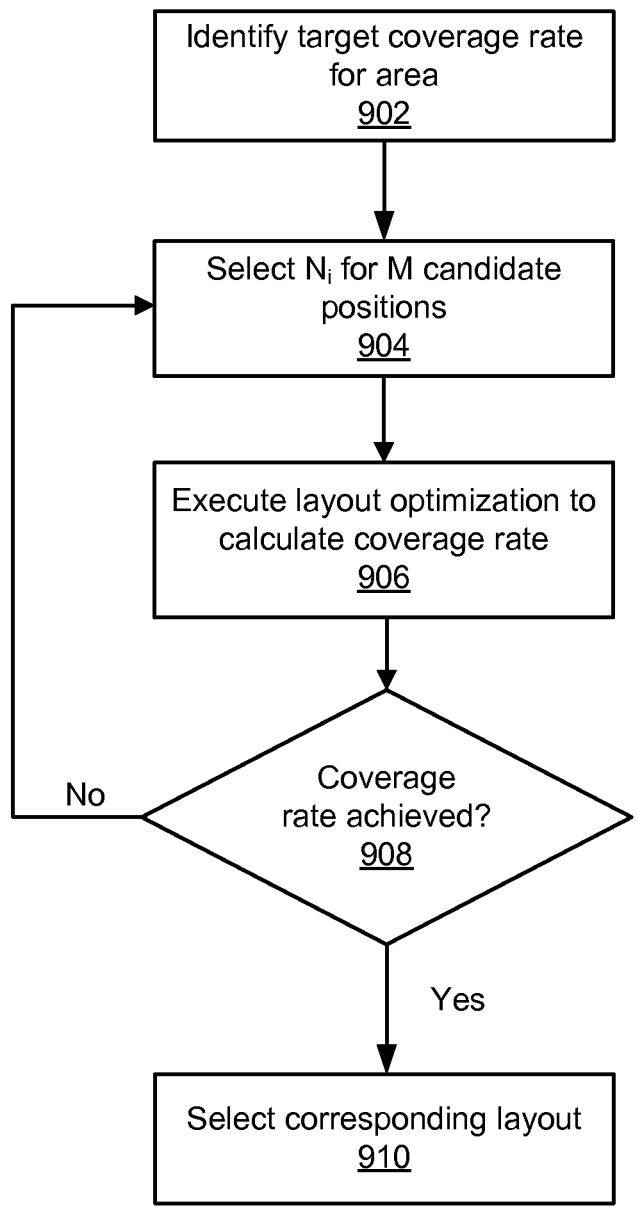
FIG. 9 is a flowchart illustrating operations for achieving a desired coverage rate.

FIG. 8 is a flowchart 800 illustrating more detailed example operations for minimizing camera movements in response to changes to an underlying traffic pattern for which an existing camera layout was calculated, while maintaining or increasing a current coverage rate. In other words, as referenced above, in scenarios in which an optimized camera layout has been calculated for an existing traffic pattern, it may occur over time that the existing traffic pattern is updated or otherwise changed. Rather than recalculate the overall camera layout for the geographical area 104 as a whole, the techniques of FIG. 8 allow for optimizing only those cameras adversely affected by the underlying traffic pattern change.

In the example of FIG. 8, a coverage rate for the current camera layout may be evaluated for both an old and new traffic pattern (802). In other words, an old or existing traffic pattern may be evaluated as being associated with a first coverage rate, while a second coverage rate may be evaluated and associated with the new, updated traffic pattern.

A coverage rate of each camera may be compared between the old and new traffic pattern (804) using the previously-evaluated coverage rate. Based thereon, a list of cameras having coverage rates which decrease after application of the new traffic pattern may be generated (806). In other words, each camera having a lower coverage rate in the context of the new traffic pattern, as compared to the same camera in the context of the previous traffic pattern, may be identified.

Subsequently, the camera layout optimization techniques of FIG. 7 may be executed, using only these identified, adversely affected cameras contained within the list of cameras (808). In other words, the techniques of FIG. 7 may be utilized, where the value N essentially refers to the N cameras that will be repositioned as a result of having been identified as being adversely affected by the change in traffic pattern. In this way, camera layout optimizations may quickly and easily be modified in conjunction with underlying changes in traffic patterns, without having to recalculate the camera layout optimization as a whole.

FIG. 9 is a flowchart 900 illustrating techniques for finding a smallest number of cameras required to fulfill a target coverage rate. For example, as referenced above, certain roads or associated areas or routes may have relatively small quantities of traffic traveling thereon. As such, in some cases, it may be desirable or preferable to minimize or avoid camera deployment, given the relatively small number of vehicles. In other scenarios, however, the relatively small number of vehicles may be precise to the reason that a high coverage rate for the roads in question may be desired, such as when it is expected that the roads in question may be used by criminals or others seeking to avoid detection. In such cases, a user of the system 300 may wish to achieve a specific coverage rate, in order to ensure the high likelihood of detecting criminal or other illicit vehicles. Of course, many other reasons may serve as a basis for wishing to obtain a specific, minimum coverage rate.

Thus, assuming that the target coverage rate will be specified for a specific sub-area of the overall geographical area 104, it may be preferable or necessary to use only those vehicles that appeared within the specific sub-area and included within the historical traffic data.

In the example of FIG. 9, the target coverage rate for the specific area in question may be identified (902). Then, an initial number $N_i$ of cameras for M candidate positions may be selected (904). For example, it may be desirable to select a relatively small number of cameras to begin the process of the flowchart 900, so that the initially-selected number of $N_i$ may be increased, and potentially ultimately decreased, until the target coverage rate is reached.

For the initial number $N_i$ of cameras, the layout optimization techniques of FIG. 7 may be executed in order to calculate an associated coverage rate (906). In other words, the techniques of FIG. 7 may be utilized, using the number of $N_i$ as the number N of cameras in FIG. 7.

If the coverage rate has not been achieved at this point (908), then a different value for $N_i$ may be selected (904). Generally speaking, if the calculated coverage rate is lower than the desired coverage rate, then the value for $N_i$ may be increased, or, conversely, a decreased value for the $N_i$ may be selected if the calculated coverage rate exceeds the new minimum required rate. Once the desired coverage rate has been achieved (908), the corresponding camera layout may be selected and deployed (910).

In the example of FIG. 9, as referenced, a number of techniques are utilized to increase or decrease the value $N_i$ in an effort to converse quickly to the desired coverage rate. In a simplified example, the value $N_i$ may initially be set to 1, and may thereafter be increased or incremented by 1 during each iteration, until the desired coverage rate is achieved. In order to accelerate this process, in other implementations, the value $N_i$ may initially be set to 1, and may thereafter be doubled at each iteration, until the coverage rate is higher than the target coverage rate. At that point, the number of $N_i$ cameras may be reduced, until the target coverage rate is reached. More detailed example techniques for adjusting the value $N_i$ to obtain the desired coverage rate are described below in the example of pseudo code 2, which essentially utilizes a binary search algorithm to determine the value $N_i$:

| Pseudo Code 2 |
|---|
| ## config1 includes the calculation procedures |
| ## num_of_camera is the number of needed camera to fulfill the target |
| ## traffic_pattern is another required input by the configuration 1 |
| ## |
| ## config1.calculate(num_of_camera, traffic_pattern); |
| ## rate = config1.get_coverage_rate( ); |
| ## while(rate < target_rate) |
| ## { |
| ## num_of_camera = num_of_camera * 2; |
| ## } |
| ## |
| ## -- now we know the optimal number of cameras is between num_of_camera/2 |
| ## -- and num of camera, reduce procedure will start to find the optimal. |
| ## |
| ## while(TRUE) -- |
| ## { |
| ## lower_bound = num_of_camera/2; |
| ## upper_bound = num_of_camera; |
| ## mid = ceiling[(lower_bound + upper_bound)/2] |
| ## config1.calculate(mid, traffic_pattern); |
| ## rate = config1.get_coverage_rate( ); |
| ## if(rate > target) |
| ## upper_bound = mid; |
| ## else if(rate < target) |
| ## lower_bound = mid; |
| ## if(upper_bound - lower_bound == 1) |
| ## return upper_bound; |
| ## } |

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one processor to:
   determine M candidate positions within an area for deployment of N media capture devices, where N<M and the N media capture devices are configured to capture data characterizing moving objects within the area;
   assign the N media capture devices to N of the M candidate positions to obtain a device layout, including (M−N) open positions;
   select a selected media capture device $N_S$ from the device layout;
   calculate a set of coverage rates characterizing rates of coverage of the moving objects, each coverage rate calculated for a tested device layout in which $N_S$ is positioned at a different one of the (M−N) open positions;
   select a coverage rate, and corresponding tested device layout, from the set of coverage rates;
   iterate, including selecting a new $N_S$ from the corresponding tested device layout and calculating a new set of coverage rates in which the new $N_S$ is positioned at different ones of new (M−N) open positions, to thereby obtain a new tested device layout;
   terminate the iterating upon reaching a termination condition; and
   select a final device layout from among all tested device layouts,
   wherein the moving objects have movement patterns defined by pathways through the area, and the final device layout is selected based on the movement patterns and the pathways, and wherein the instructions, when executed, are further configured to cause the at least one processor to
   compare, following a change of a subset of the movement patterns, a coverage rate for each media capture device prior to the change in movement patterns with a coverage rate for the same media capture device following the change in movement patterns,
   generate a list of media capture devices for which a coverage rate decreased following the change in movement patterns, and
   use the list of media capture devices as the N media capture devices during subsequent iterations to obtain an updated final device layout.

2. The computer program product of claim 1, wherein the moving objects include vehicles, and the media capture devices include video cameras.

3. The computer program product of claim 1, wherein the M candidate positions are defined at center points of intervals along pathways through the area.

4. The computer program product of claim 1, wherein the instructions, when executed, are configured to cause the at least one processor to:
   assign the N media capture devices to N of the M candidate positions randomly.

5. The computer program product of claim 1, wherein the instructions, when executed, are configured to cause the at least one processor to:
   calculate the set of coverage rates including calculating each coverage rate as a ratio of the moving objects captured by the N media capture devices to a total number of the moving objects in the area, within a defined period of time.

6. The computer program product of claim 1, wherein the instructions, when executed, are configured to cause the at least one processor to:
   calculate each coverage rate including
     selecting a moving object and its routes through the area from a database of the moving objects and their routes,
     identifying, from the N media capture devices, a media capture device along the routes,
     adding the moving object to a list for the media capture device, and
     calculating a coverage rate for the media capture device including comparing the list to the moving objects from the database having at least one route past the media capture device.

7. The computer program product of claim 1, wherein N is a fixed number and the final device layout is selected as having a best-available coverage rate for the N media capture devices.

8. The computer program product of claim 1, wherein the instructions, when executed, are configured to cause the at least one processor to:
- determine whether the final device layout satisfies a required coverage rate;
- select an updated value for N, where the updated value for N is increased if the coverage rate of the final device layout is less than the required coverage rate, or decreased if the coverage rate of the final device layout is more than the required coverage rate; and
- continue iterations until a final value of N is determined that provides the required coverage rate.

9. The computer program product of claim 1, wherein the termination condition is defined by at least one of a maximum number of iterations or converging coverage rate values.

10. The computer program product of claim 1, wherein the coverage rate is selected using Gibbs sampling.

11. A computer-implemented method for executing instructions stored on a non-transitory computer readable storage medium, the method comprising:
- determining M candidate positions within an area for deployment of N media capture devices, where N<M and the N media capture devices are configured to capture data characterizing moving objects within the area;
- assigning the N media capture devices to N of the M candidate positions to obtain a device layout, including (M−N) open positions;
- selecting a selected media capture device $N_S$ from the device layout;
- calculating a set of coverage rates characterizing rates of coverage of the moving objects, each coverage rate calculated for a tested device layout in which $N_S$ is positioned at a different one of the (M−N) open positions;
- selecting a coverage rate, and corresponding tested device layout, from the set of coverage rates;
- iterating, including selecting a new $N_S$ from the corresponding tested device layout and calculating a new set of coverage rates in which the new $N_S$ is positioned at different ones of new (M−N) open positions, to thereby obtain a new tested device layout;
- terminating the iterating upon reaching a termination condition; and
- selecting a final device layout from among all tested device layouts,
- wherein the moving objects have movement patterns defined by pathways through the area, and the final device layout is selected based on the movement patterns and the pathways, the method further comprising
- comparing, following a change of a subset of the movement patterns, a coverage rate for each media capture device prior to the change in movement patterns with a coverage rate for the same media capture device following the change in movement patterns,
- generating a list of media capture devices for which a coverage rate decreased following the change in movement patterns, and
- using the list of media capture devices as the N media capture devices during subsequent iterations to obtain an updated final device layout.

12. The method of claim 11, wherein calculating the set of coverage rates comprises:
- calculating each coverage rate as a ratio of the moving objects captured by the N media capture devices to a total number of the moving objects in the area, within a defined period of time.

13. The method of claim 11, wherein calculating the set of coverage rates comprises:
- calculate each coverage rate including
  - selecting a moving object and its routes through the area from a database of the moving objects and their routes,
  - identifying, from the N media capture devices, a media capture device along the routes,
  - adding the moving object to a list for the media capture device, and
  - calculating a coverage rate for the media capture device including comparing the list to the moving objects from the database having at least one route past the media capture device.

14. The method of claim 11, wherein N is a fixed number and the final device layout is selected as having a best-available coverage rate for the N media capture devices.

15. The method of claim 11, comprising:
- determining whether the final device layout satisfies a required coverage rate;
- selecting an updated value for N, where the updated value for N is increased if the coverage rate of the final device layout is less than the required coverage rate, or decreased if the coverage rate of the final device layout is more than the required coverage rate; and
- continuing iterations until a value of N is determined that provides the required coverage rate.

* * * * *